US005913475A

United States Patent [19]

Ashkenazi

[11] Patent Number: 5,913,475

[45] Date of Patent: Jun. 22, 1999

[54] ANTI-STUFFING COIN RETURN FOR A TELEPHONE PAYSTATION

[75] Inventor: Ellis Ashkenazi, Placentia, Calif.

[73] Assignee: Calstar Technologies, Inc., Anaheim, Calif.

[21] Appl. No.: 09/118,803

[22] Filed: Jul. 20, 1998

[51] Int. Cl.[6] .................... B65G 11/04

[52] U.S. Cl. .................... 232/57.5; 232/55; 194/202; 379/145

[58] Field of Search .................... 232/55, 56, 57, 232/57.5, 58, 59, 60, 61; 194/202, 203, 204; 379/145, 150

[56] References Cited

U.S. PATENT DOCUMENTS

| | | | |
|---|---|---|---|
| 3,116,013 | 12/1963 | Eno et al. | 232/57.5 |
| 5,018,193 | 5/1991 | DeArkland | 379/145 |
| 5,102,038 | 4/1992 | Anello et al. | 232/57.5 |
| 5,146,492 | 9/1992 | Stone et al. | 232/57.5 X |
| 5,361,979 | 11/1994 | Anello et al. | 232/57.5 |
| 5,400,396 | 3/1995 | Hsu | 379/145 |
| 5,411,207 | 5/1995 | Ashkenazi . | |
| 5,431,338 | 7/1995 | Ashkenazi . | |
| 5,515,594 | 5/1996 | Ashkenazi . | |
| 5,727,054 | 3/1998 | Anello et al. | 379/145 |

*Primary Examiner*—Brian K. Green
*Assistant Examiner*—William L. Miller
*Attorney, Agent, or Firm*—James G. O'Neill

[57] ABSTRACT

An improved anti-stuffing coin return for a telephone paystation, which is highly resistant to explosives due to front and rear openings, has a pair of diverging side walls and at least one internal movable plate, all made from a high strength material. The outer casing may include a push button that cooperates with the movable plate to help move any materials stuffed therein and allow coins to flow to a coin retrieval area adjacent an open front area. Additionally, a coin slide in the coin path may pivot to substantially block the force and gases of any explosive materials detonated therein.

17 Claims, 2 Drawing Sheets

ANTI-STUFFING COIN RETURN FOR A TELEPHONE PAYSTATION

BACKGROUND OF THE INVENTION

1. Field of the Invention

This invention relates generally to telephone paystation coin returns, and more particularly, to an improved anti-stuffing coin return for a telephone paystation.

2. Description of Related Art

As is well known, increasing the security of coin operated telephones or paystations installed in public places has long been a factor in their design. The exterior of such paystations, and particularly the coin return area of known telephone paystations are vulnerable to thieves, vandals, or the like (hereinafter collectively referred to as "vandals"), and proposed solutions for solving this area of vulnerability have failed to provide adequate protection to the existing paystations. For example: persistent and resourceful vandals utilize tools to pry existing coin returns from the paystation housings; stuff various flexible materials through the opening in these coin returns; and/or insert and ignite cherry bombs, M-80s or other explosive materials through the openings and behind the pivoting doors mounted in such openings. Such vandalism causes widespread inconvenience and problems, and costs millions of dollars each year. This is graphically spelled out in a study done by New York Telephone ("NYT") and published in the May 1993 issue of Public Communications Magazine, wherein it stated that it costs NYT over $10,000,000 per year to repair or replace pay phones located in New York city. The study specifically pinpointed cherry bombs, or other explosive devices inserted in coin returns, as the cause of much of the damage and resultant costs.

With the expected continued rise in revenues to be taken in by telephone paystations over the years, it is obvious that they will become an even more attractive and lucrative target for vandals. In an attempt to dissuade vandals, numerous attempts have been made to prevent the stuffing of flexible materials, or the insertion of explosives, into the coin returns of telephone paystations. Such attempts include: adding exterior doors to the coin returns; adding armor around the coin return, or the door of the coin return; adding devices to the interior surface of the existing coin return door; the modification of the exterior coin return opening; the modification of the interior of the coin return door; the modification of the coin retrieval portion of the coin return; or the modification of the coin return chute. However, particularly in large metropolitan areas, such as New York City, this added protection, new devices, or modifications to the coin returns do not solve all of the problems, or prevent the need for expensive repairs or replacements of telephone paystations.

Although the devices and modifications described above have prevented some of the known problems and hindered vandals in some situations, they have not been successful in preventing the stuffing of all explosive or flexible materials into or adjacent coin returns, thereby still allowing determined vandals to steal coins from or disable such paystations. Additionally, these known devices and modifications do not consistently prevent damage to the internal components of the paystation or to the coin return itself when explosive materials are inserted therein, or applied to the exterior surface area around the coin return opening. Finally, some of the disadvantages of adding protective plates or covers to the lower housing or coin return door of a paystation, as set forth in some of the known devices or methods, are that they actually deflect the gases or explosive force of any explosives detonated therein into the telephone enclosure and the internal components thereof. Or, the added weight of such protective covers make the coin box more difficult and cumbersome to open and remove. Or, the added cover offers sharp edges or surfaces that a vandal may use as an application point for prying tools. Additionally, the adding of covers or plates to existing equipment in paystations may add significantly to their cost, which added cost cannot always be justified.

A number of solutions to overcome the problems with prior art devices are set forth in U.S. Pat. Nos. 5,411,207, 5,431,338 and 5,515,594, naming the inventor of the present invention and assigned to Calstar Technologies, Inc. of Anaheim, Calif. These patents disclose devices having pivotable sweep flaps to expel unwanted materials, and to block and dissipate the force and gases of any explosive materials detonated therein; as well as a method of inserting such devices into a telephone paystation. However, these devices, although a substantial improvement over prior art devices, are not useful in all situations involving materials stuffed into the devices.

Therefore, there still exists a need in the art for a more dependable anti-stuffing coin return which is low in cost, easy to manufacture and install, and which overcomes the problems set forth in connection with the stuffing of materials therein.

The invention disclosed herein overcomes many of the above-mentioned limitations and problems as well as additional problems, such as drug dealers or others using telephone paystation coin returns for drug deals or other nefarious schemes. This is usually accomplished by inserting drugs, syringes, or other unwanted items behind coin return doors for collection by a third party. However, an unsuspecting pay phone user reaching for change after attempting to use the telephone may come in contact with the drugs, or be harmed by the syringes or other items inserted therein. Applicant's novel device overcomes this problem, and others, by the provision of an improved, anti-stuffing coin return having no coin return door at the front of the opening behind which items may be hidden. Applicant's device is specifically designed to allow any materials stuffed into the opening to be seen, or to not become lodged in the coin return retrieval area because of its shape. Furthermore, an internal cooperating slide member moves to dissipate and block the force of any explosive materials inserted and exploded in the coin return area to prevent any damage to the delicate electronic internal components of the telephone. Additionally, the improved coin return of the present invention may be used for new telephone paystations installations, or, is readily adapted for use with existing telephone paystations to provide added security to the coin return area.

SUMMARY OF THE INVENTION

Accordingly, it is a general object of the present invention to provide an improved coin return for a telephone paystation. It is a particular object of the present invention to provide an improved coin return for a telephone paystation which is adapted to be securely attached in existing telephone paystation enclosures. It is a still more particular object of the present invention to provide an improved coin return for a telephone paystation which is designed to foil vandals. It is yet a more particular object of the present invention to provide an improved coin return for a telephone paystation which is shaped to prevent the stuffing of materials therein, and to both dissipate and block the explosive force of any explosives detonated therein. It is a further particular object of the present invention to provide an improved coin return for a telephone paystation having a wedge shaped to prevent the lodging of stuffed materials therein. It is yet another particular object of the present invention to provide an improved coin return for a telephone paystation which includes an internal means to prevent stuffed materials from being inserted into the coin path. It is a still further particular object of the present invention to provide an improved coin return for a telephone paystation having an open back to allow stuffed materials to be easily removed or to fall into a holding area. It is yet a further particular object of the present invention to provide an improved coin return for a telephone paystation having no outside door, and a sturdy structure that prevents damage by explosives. It is yet a still further particular object of the present invention to provide an improved coin return for a telephone paystation assembly having cooperating internal components forming a coin path having enhanced security for the coin return and the telephone paystation enclosure. And, it is a final particular object of the present invention to provide an improved, anti-stuffing coin return for a telephone paystation having a plurality of exterior and interior components fabricated from stainless steel, which may be easily manufactured and readily incorporated into existing telephone paystations to provide a sturdier coin return, which prevents blockage from stuffed materials, and substantially blocks and diminishes the force of any explosives detonated therein.

In accordance with one aspect of the present invention, there is provided an improved coin return assembly for a telephone paystation with a front plate and a pair of diverging outer walls incorporating a ramp, slide and a plurality of spacers forming an internal coin path and having open front and rear portions which requires any inserted materials to be pressed too far into the coin return where it will be out of the coin path. At least one internal means is movably mounted to the front plate, within the coin path, to cooperate with and aid in loosening any materials stuffed therein.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, in which:

DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to describe an improved anti-stuffing coin return for a telephone paystation assembly, identified generally at 10.

Figure 5:
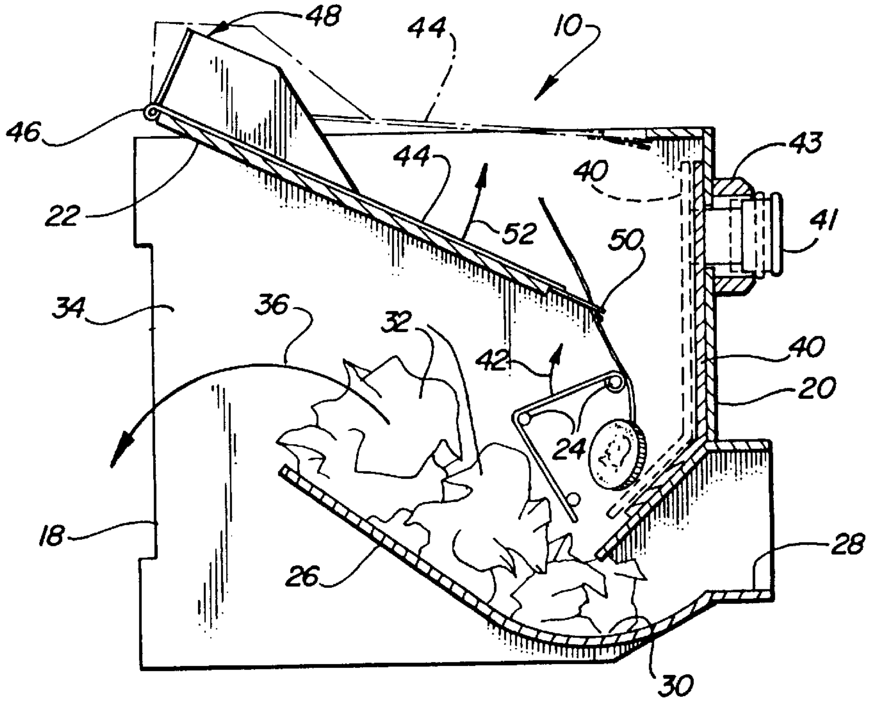
FIG. 5 is an enlarged cross-sectional view of FIG. 2 showing a coin on a string and stuffed material therein.
Figure 6:
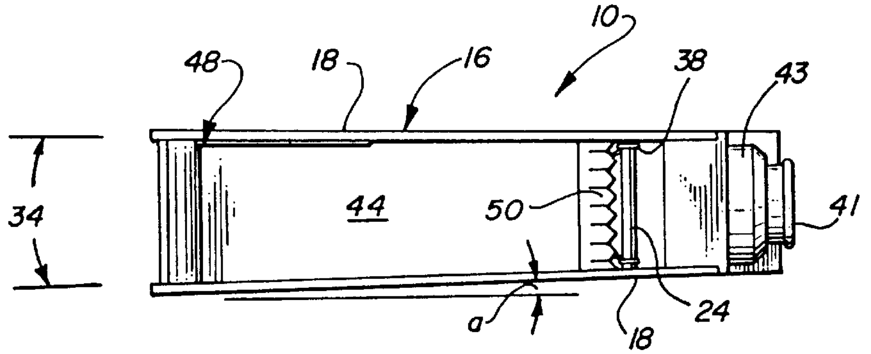
FIG. 6 is a top plan view of the improved coin return of FIG. 2.

Turning now to the drawings, a preferred embodiment of the coin return 10 is shown inserted in a telephone paystation 12, which may be supported on a pedestal 14, or against a wall. The coin return 10 includes an exterior housing 16 comprised of two angled outside or side walls 18 and a front plate 20. The side walls 18 and front plate 20 are preferably made from stainless steel, or some other hardened material, and secured together with the walls 18 at an angle "a" to the front plate, and a top coin slide 22, a plurality of pins or spacers 24 and a lower ramp 26 secured therein. The lower ramp 26 has no exterior door, and ends in an outer substantially rectangular open area 28, shaped and dimensioned so as to snugly fit against or into the front plate 20. The rectangular open front area 28 allows a person to insert one or more fingers therein to retrieve coins from a coin return area 30, between ramp 26 and the open front area. As best shown in FIG. 6, the side walls 18 are preferably angled outwardly from front wall 20 at an angle "a", so that the rear opening 34 is wider than the front plate 20, and any materials inserted through the open front area 28 will not be lodged between the side walls 18, but will travel up the ramp 26. That is, any inserted material will not be easily retained therein to block the coin path. As shown in FIG. 5, any material 32 inserted in open area 28, will generally be forced rearwardly, out of the coin retrieval area 30, and up ramp 26, in the direction of arrow 36, where the material may easily fall or be pushed through the rear opening 34, into a storage area, or the like.

Figure 1:
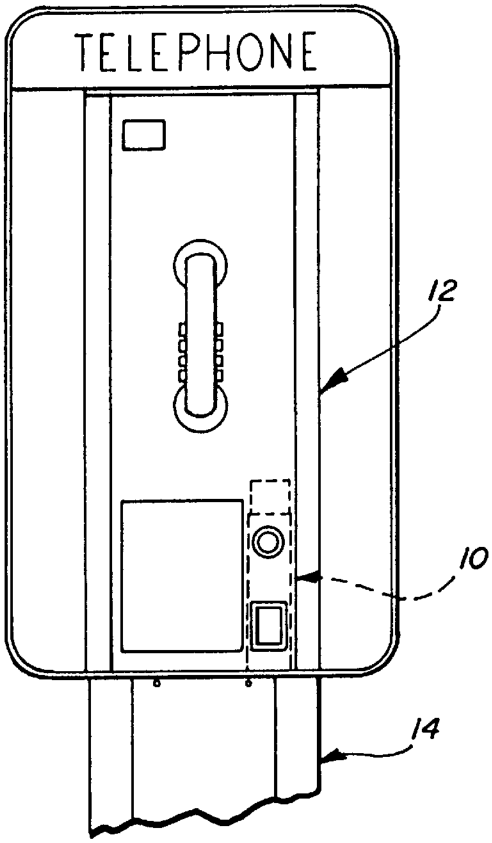
FIG. 1 is a front elevational view of a telephone paystation incorporating an improved coin return of the present invention therein.
Figure 2:
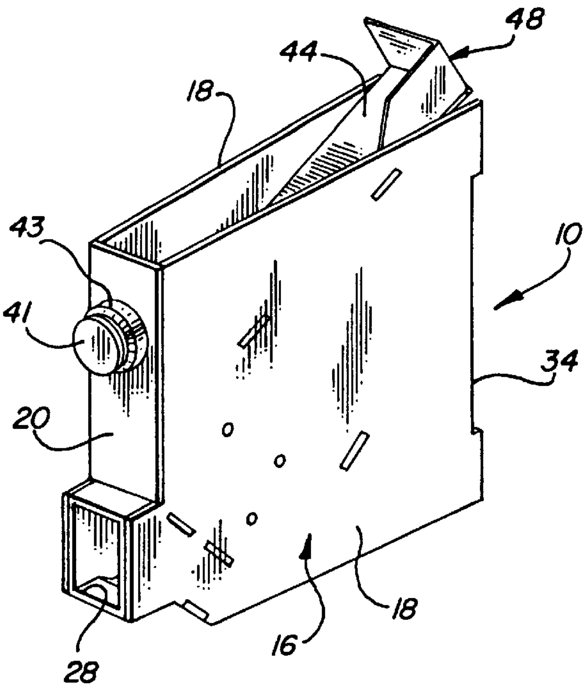
FIG. 2 is a perspective view of the improved coin return of the present invention.

Referring to FIG. 1, the coin return 10 of the present invention is preferably inserted into and held in an existing coin return area of the telephone paystation enclosure 12. The housing 16 is sized and dimensioned so that it is held between the front and rear of the telephone paystation, without requiring any adapters, or the like.

Figure 3:
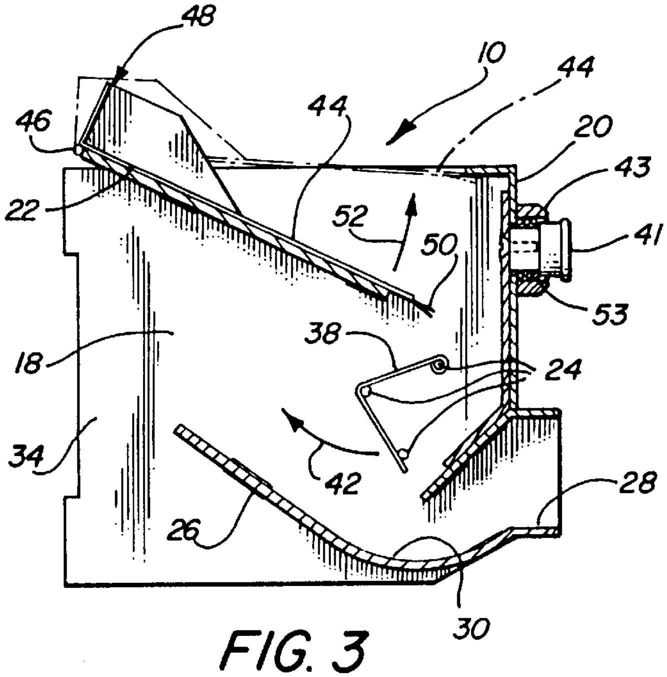
FIG. 3 is a cross-sectional view of the improved coin return of FIG. 2.
Figure 4:
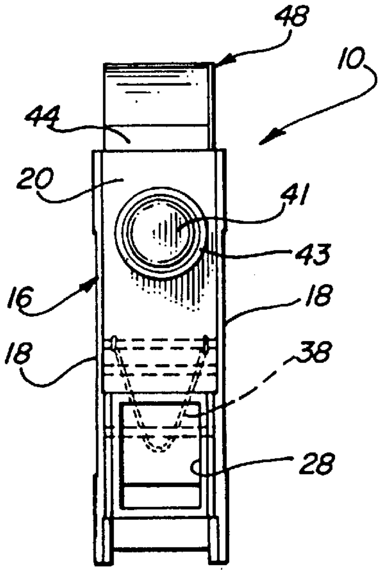
FIG. 4 is a front elevational view of the improved coin return of FIG. 2.

As best shown in FIGS. 3–5, the coin path in the coin return 10 may include one or more security means, such as a blocking/rotating clip means 38, which may be mounted to move or pivot around top pin 24, and a movable plate 40, operated by a spring-biased push button means 41, extending through an opening 39 formed in front plate 20. These security means 38, 40 assist in keeping the coin path open, as by deflecting or moving any materials stuffed into the coin path. The clip 38, if used, is preferably resilient and wraps around the plurality of pins 24, to prevent materials from passing between the pins 24 into the internal coin path. The clip 38 may be rotated on the top pin 24 to both block materials from entering between the pins, and to be rotated by external means, not shown, in the direction of arrow 42, to push away any material impinging on the coin path. The movable plate 40 is designed so that its lower end cannot be reached, or is difficult to be tampered with by a vandal.

Figure 7:
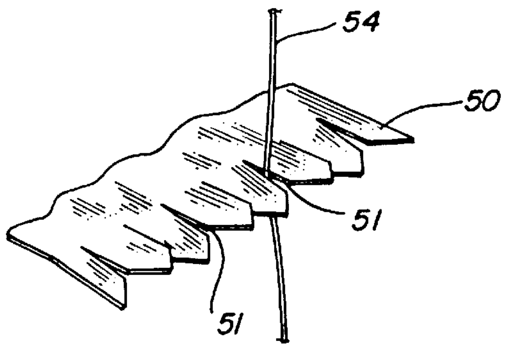
FIG. 7 is an enlarged, partial perspective view of the end of a rotatable slide of the present invention, showing a string cut-off blade.

The internal coin path of housing 16 is defined by and includes the internal coin slide 22, and a further slide or chute 44 pivotably connected to or over the slide 22, at a pivot point 46. When coins are dropped from the telephone paystation, they first enter a top open portion 48, which may include a pair of plates or walls, hit and roll or slide down chute or slide 44, and pass around an end 50 of the chute. End 50 has a knife means thereon having a plurality of cutting edges 51 (see FIG. 7), to cut off any string 54, or the like, which might be attached to a coin (see FIGS. 5 and 7). The coins then pass through or under the pins 24 onto the ramp 26, where they will come to rest in coin retrieval area 30. If, for any reason, the internal coin path is blocked by material, such as 32, which has been pulled, or otherwise forced between the pins 24 until it contacts plate 40, the push button 41 may be actuated to move plate 40 inwardly to the broken line position shown in FIG. 5, thereby moving away any material in the coin path, and allowing any blocked coins to travel to the coin retrieval area 30.

Because of the open front area 28 and open rear 34, the explosive force and any gasses caused by any materials detonated in coin retrieval area 30, or near the coin return 10, will be dissipated or expelled outwardly through these open front and rear areas. Furthermore, if desired, the chute 44 may be made to pivot around a pivot point 46, and any upwardly moving gases or debris will press against a bottom of the pivotable slide 44, to pivot the slide 44, around pivot point 46, upwardly in the direction of arrow 52, to the position shown in broken line in FIGS. 3 and 5, to thereby block such gases and debris from entering into the interior of the phone.

The front plate 20, side walls 18, as well as the remaining components of the coin return housing 16, are fabricated, in any desired manner, to exacting tolerances and are made from strong, rigid, and secure high strength materials, such as stainless steel, to resist tampering with by vandals, and to hold up if an explosive material is detonated therein. Furthermore, as discussed above, if an explosive device is detonated in the coin return, the open front and rear areas help to dissipate the force, and to expel gasses. Also, if the slide 44 is pivotable, it will be rotated by the force of the explosion into solid contact with a portion of the front plate 20, to thereby form a seal to prevent any explosive force or vapor from reaching the delicate internal components of the pay phone. The open rear 34 of the coin return is wider than the front so as to normally prevent stuffed materials from becoming lodged in the coin return and to allow any such materials inserted in front opening 28 to be easily moved in the direction of arrow 36, along the ramp 26.

As shown in FIGS. 2–6, the front plate 20 may include a guide or rim 43, around the push button 41, and a spring 53 may be held in the push button to bias the push button to the outer or rest position shown.

Those skilled in the art will appreciate that the above-described preferred embodiments are subject to numerous modifications and adaptations without departing from the scope and spirit of the invention. Therefore, it is to be understood that, within the scope of the appended claims, the invention may be practiced other than as specifically described herein.

What is claimed is:

1. An anti-stuffing coin return for insertion into a telephone paystation enclosure assembly, comprising, in combination:

an exterior housing comprised of two side walls and a front plate having a coin access opening formed therein each of the two side walls are formed at an angle to the front plate so as to diverge away from each other;

a substantially rectangular internal cavity defined by an open rear area of the housing that is wider than said front plate, and a coin retrieval area that is open at all times to the coin access opening to allow coins and other materials in the coin retrieval area to be viewed through the coin access opening;

a plurality of internal spacers held between the two angled side walls and sized and dimensioned to fit snugly between the two angled walls and form a coin path in the substantially rectangular internal cavity;

the coin path formed in the substantially rectangular internal cavity also including a coin slide, a coin entry area and the coin retrieval area;

at least one movable security element held in the substantially rectangular internal cavity; and an actuating element mounted on the front plate and cooperating with the at least one movable security element, for selectively moving the at least one movable security element into the coin path.

2. The coin return of claim 1 wherein the coin slide includes a cutting edge fixed to one end thereof, to cut any cords attached to coins inserted into the coin return.

3. The coin return of claim 1, further including a blocking element in the coin path, between the coin slide and the coin retrieval area to block any material stuffed into the coin access opening from entering the coin path.

4. The coin return of claim 1 wherein the at least one movable security element is a movable plate held against an interior surface of the front plate.

5. The coin return of claim 4 wherein the actuating element is a push button mounted in the front plate for controlling the movement of the movable plate into and out of the coin path.

6. The coin return of claim 5, further including a pivot point securing the coin slide in the interior of the exterior housing to allow limited rotational movement of the coin slide.

7. The coin return of claim 6 wherein the plurality of internal spacers are comprised of pins in the coin path.

8. The coin return of claim 1 wherein the plurality of internal spacers are comprised of pins in the coin path and a blocking element is mounted over the pins.

9. The coin return of claim 8 wherein the at least one movable security element is a movable plate held against an interior surface of the front plate.

10. The coin return of claim 9 wherein the actuating element is a push button mounted in the front plate for controlling the movement of the movable plate into and out of the coin path.

11. The coin return of claim 10, further including a pivot point securing the coin slide in the interior of the exterior housing to allow limited rotational movement of the coin slide.

12. An anti-stuffing coin return for insertion into a telephone paystation enclosure assembly, comprising, in combination:

an exterior housing comprised of two side walls secured to a front plate having a coin access opening formed therein;

each of the side walls being secured to the front plate at an angle of more than 90 degrees such that the side walls diverge away from each other to form a substantially rectangular internal cavity defined by an open rear area of the housing that is wider than said front plate, and a coin retrieval area that is open at all times to the coin access opening to allow coins and other materials in the coin retrieval area to be viewed through the coin access opening;

a plurality of internal spacers held between the two angled side walls and sized and dimensioned to fit snugly between the two angled walls and form a coin path in the substantially rectangular internal cavity;

the coin path formed in the substantially rectangular internal cavity also including a coin slide, a coin entry area and the coin retrieval area;

a movable release element sized and dimensioned to fit snugly against an inner surface of the front plate held in the substantially rectangular internal cavity; and a push button actuating element held in the front plate and cooperating with the movable release element to selectively push away any stuffed materials contacting the movable release element in the coin path.

13. The coin return of claim 12 wherein the push button actuating element is spring-biased to a rest position, away from the front plate.

14. The coin return of claim 13, further including a knife edge formed at an outer end of the coin slide forming part of the internal coin path, between the coin entry area and the coin retrieval area.

15. The coin return of claim 14 wherein the coin slide is mounted to a pivot point formed at an inner end thereof adjacent to the coin entry opening, and the coin retrieval area is formed between an angled ramp and the coin access opening.

16. An anti-stuffing coin return housing comprising, in combination:

a pair of angled walls and a front plate secured together to form an interior cavity in the coin return housing;

the front plate including a front open area through which coins may be retrieved;

the coin return housing including an internal coin path extending between a coin entry area and a coin retrieval area, adjacent the front open area;

the internal coin path including a pivotable coin slide mounted adjacent the coin entry area, a plurality of pins held between the angled walls, below the coin slide and a sloped coin ramp, including the coin retrieval area opening to the adjacent front open area;

the coin return housing having an open rear portion formed between the pair of angled walls which is wider than the front plate;

a movable plate mounted on a rear surface of the front plate to move any materials stuffed into the coin path and contacting the movable plate;

a spring-biased push button mounted in the front plate and contacting the movable plate to move the movable plate; and a blocking element movably held over the plurality of pins, to block the insertion of material between the plurality of pins.

17. The coin return of claim 16 wherein the pair of walls are formed at an angle to the front plate so as to diverge away from each other.

* * * * *